No. 863,403. PATENTED AUG. 13, 1907.
C. KNOPF.
SPEED INDICATOR.
APPLICATION FILED JAN. 10, 1907.
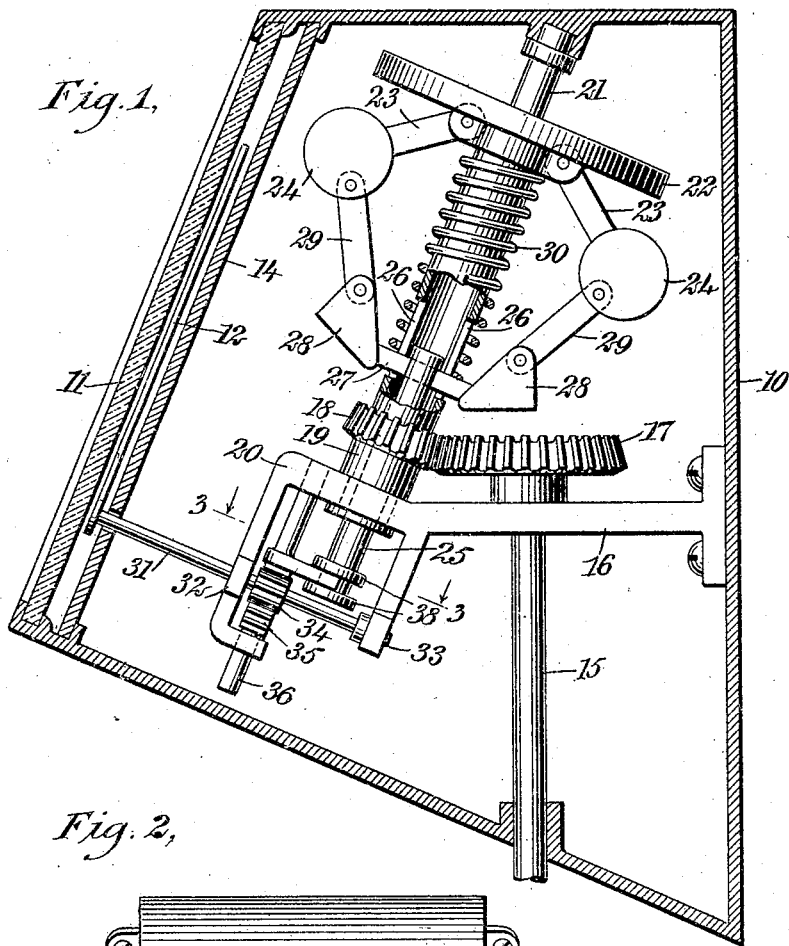
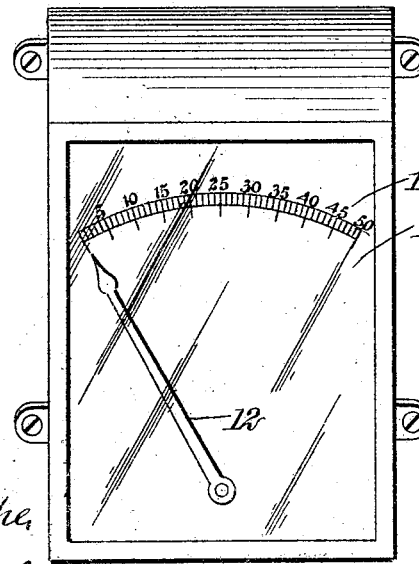
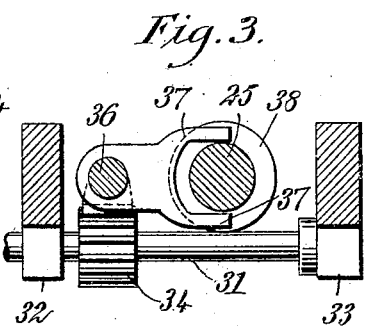
WITNESSES
Edw. Thorpe
C. W. Fairbank
INVENTOR
Carl Knopf
BY Munn & Co
ATTORNEYS

UNITED STATES PATENT OFFICE.

CARL KNOPF, OF NEW YORK, N. Y.

SPEED-INDICATOR.

No. 863,403.

Specification of Letters Patent.

Patented Aug. 13, 1907.

Application filed January 10, 1907. Serial No. 351,645.

*To all whom it may concern:*

Be it known that I, CARL KNOPF, a citizen of the United States, and a resident of the city of New York, borough of Brooklyn, in the county of Kings, State of New York, have invented a new and Improved Speed-Indicator, of which the following is a full, clear, and exact description.

This invention relates to certain improvements in devices for indicating the speed of rotating parts, and more particularly to a device adapted to be attached to vehicles to indicate the speed of travel; the object being to provide a device of this character which is simple in construction, provided with the minimum number of parts, and capable of accurately indicating the speed.

The invention consists in certain features of construction and combination of parts, all of which will be fully set forth hereinafter and particularly pointed out in the claims.

Reference is to be had to the accompanying drawings forming a part of this specification, in which similar characters of reference indicate corresponding parts in all the figures, in which Figure 1 is a side elevation of the operating parts, the inclosing casing being shown in section; Fig. 2 is a face view of the indicator; and Fig. 3 is a transverse section taken on the line 3—3 of Fig. 1.

My improved indicator hereinafter described and claimed is identical with that disclosed but not claimed in Patent No. 839,574, granted December 25, 1906, to myself and Carl Johnson.

The operating parts are inclosed within a casing having a substantially vertical wall 10 adapted to be secured to the dash board of a vehicle or in any other suitable position, and having an inclined transparent face 11 through which the position of the pointer 12 in respect to the numbered scale 13 on the plate 14, may be clearly seen. The face wall 11 is preferably inclined so as to bring it at right angles to the line of vision of a person seated in the vehicle, although it is evident that this wall may, if desired, be arranged vertically or horizontally. The front and back walls of the casing are connected by top, bottom and side walls of any suitable character, and through one of these walls extends the shaft 15 adapted to be operatively connected to some rotating part of the vehicle or other device the speed of which it is desired to indicate. The shaft 15 is mounted in any suitable form of bearings, and is preferably supported adjacent its inner end by means of a bracket 16, adjacent which is located a gear wheel 17 rigidly secured to the shaft 15. This gear wheel is preferably beveled and coacts with a gear wheel 18 mounted on the hollow inclined shaft 19. This shaft is preferably located in a plane parallel to the plane of the face plate 11 and is mounted in any suitable manner, as, for instance, in the top wall of the casing or within brackets secured to the rear wall.

As shown, the lower end of the shaft is secured within a branch 20 of the bracket 16, while the upper end of the shaft is connected to a rod 21 mounted within a socket in the top of the casing. The hollow shaft 19 carries a metal disk 22 which serves to a certain extent as a fly wheel, while to the under side of this disk are pivoted arms 23 having at their outer and lower ends balls 24.

Within the hollow shaft 19 is a longitudinally movable rod 25 having its upper end terminating adjacent oppositely-disposed longitudinal slots 26 in the hollow shaft, and through these slots and rigidly secured to the longitudinally movable rod 25 is a cross bar 27 carrying blocks 28 on its outer ends, which blocks are connected to the balls 24 by means of pivoted connecting links 29. Intermediate the pivotal supports of the arms 23 and the cross bar 27 and surrounding the hollow shaft 19, there is provided a coil spring 30 normally tending to press the bar 27 away from the disk 22 and draw the balls 24 toward the rotating shaft. As the shaft is rotated centrifugal action throws the balls outward away from the shaft and tends to contract the spring 30, as will be clearly understood from an inspection of the drawings.

The pointer 12 is rigidly secured to a rotatable shaft 31 which extends through the face plate 14 and is mounted within bracket arms 32 and 33 extending downward from the bracket 20. This shaft carries a pinion 34 adapted to be operated by a rack bar 35 carried by the reciprocating rod 36. This rod is provided with yoke arms 37 extending between collars 38 rigidly secured to the lower end of the longitudinally movable rod 25. It will thus be noted that the rods 36 and 25 will be caused to move simultaneously, and as one of these rods is moved by a rotation of the shaft 15 and the other of the rods operates the pointer 12, movement of the shaft 15 will affect the pointer 12, and the greater the speed at which the shaft 15 is rotated, the greater will be the longitudinal movement of the two rods and the greater will be the arc through which the pointer 12 moves.

The shaft 15 is preferably connected directly to the axle of the vehicle or to some other rotating part and its speed will correspond directly with the speed of the vehicle. The speed at which the hollow shaft 19 rotates will be directly proportional to the extent of the outward movement of the balls 24, and this outward movement will affect to a directly proportional extent the movement of the rod 25 and the pointer 12. The parts are all rigidly connected, and there is no lost motion or movement among the varying parts.

The device is extremely simple in construction, and by reason of its simplicity is very accurate.

Having thus described my invention, I claim as new and desire to secure by Letters Patent:

1. A speed indicator, comprising a casing having an inclined front wall, a vertical shaft within the casing, an inclined shaft within the casing and mounted substantially parallel to the front wall bevel gearing connecting said shafts, centrifugal means carried by the inclined shaft, a longitudinally movable rod connected to said centrifugal means, an indicator adjacent the inclined front wall, and means whereby movement of the rod causes a corresponding movement of the indicator.

2. A speed indicator, comprising a shaft having one end thereof hollow, a longitudinally movable rod having one end thereof extending into the hollow end of the shaft, centrifugal members pivotally connected to said shaft and to said rod, whereby a variation in the speed of rotation of said shaft causes a longitudinal movement of said rod, said rod having an annular groove adjacent the lower end thereof, a pointer, and a movable member having yoke arms in operative engagement with the groove of the rod and operatively connected to said pointer.

3. A speed indicator, comprising a shaft journaled in a substantially upright position and having the lower end thereof hollow, a longitudinally movable rod having the upper end thereof extending into the hollow lower end of said shaft, centrifugal members pivotally connected to said shaft and to said rod through slots in the shaft, whereby a variation in the speed of rotation of said shaft causes a longitudinal movement of said rod, said rod having an annular groove adjacent the lower end thereof, a pointer, and a movable member extending into the groove of said rod and operatively connected to said pointer.

4. A speed indicator, comprising a rotating member, a longitudinally movable rod, means whereby variations in the speed of rotation of said member causes longitudinal movement of said rod, a second rod supported adjacent said first mentioned rod, collars mounted on one of said rods, yoke arms carried by the other of said rods and in engagement with said collars, a rack bar operatively connected to the second rod, a pointer, and a pinion operatively connected thereto and in engagement with said rack bar.

5. A speed indicator, comprising a hollow shaft, means for rotating said shaft, a rod within said shaft and longitudinally movable in respect thereto, a disk secured to said shaft, arms pivotally connected to said shaft, balls carried by said arms at the outer ends thereof, a cross bar carried by said rod and extending out through slots in the sides of said shaft, means connecting said cross bar to said balls, a coil spring surrounding said shaft and in engagement with said cross bar, an indicator, and means whereby the indicator is operated by the longitudinal movement of the rod.

6. A speed indicator, comprising a casing having a vertical rear wall and an inclined transparent front wall, a vertical shaft supported adjacent the rear wall, an inclined shaft supported adjacent and parallel to the front wall, bevel gearing connecting said shafts, centrifugal means carried by the inclined shaft, a longitudinally movable rod connected to said centrifugal means, an indicator adjacent the inclined front wall, and means whereby movement of the rod causes a corresponding movement of the indicator.

7. A speed indicator, comprising a rotating member, a longitudinally movable rod, means whereby variations in the speed of rotation of said member causes longitudinal movement of said rod, a second rod supported adjacent said first mentioned rod and longitudinally movable, collars carried by said first mentioned rod, yoke arms carried by said second rod and in engagement with the first mentioned rod between said collars, a rack bar carried by said second rod, a shaft, a pinion carried by said shaft and in engagement with said rack bar, and a pointer carried by said shaft, whereby the speed of rotation of the rotating member may be indicated by the position of the pointer.

In testimony whereof I have signed my name to this specification in the presence of two subscribing witnesses.

CARL KNOPF.

Witnesses:
JNO. M. RITTER,
CLAIR W. FAIRBANK.